United States Patent [19]
Ogawa et al.

[11] Patent Number: 4,630,136
[45] Date of Patent: Dec. 16, 1986

[54] REPRODUCED SIGNAL SWITCHING CIRCUIT FOR REPRODUCING APPARATUS HAVING ROTARY HEADS FOR SPECIAL REPRODUCTION

[75] Inventors: Yukio Ogawa, Tokyo; Koji Matsumura, Yokohama, both of Japan

[73] Assignee: Victor Company of Japan, Ltd., Japan

[21] Appl. No.: 652,523

[22] Filed: Sep. 20, 1984

[30] Foreign Application Priority Data

Sep. 26, 1983 [JP] Japan .................. 58-177529

[51] Int. Cl.$^4$ ............................................ H04N 5/783
[52] U.S. Cl. .................... 360/10.3; 360/10.2; 360/64
[58] Field of Search .................. 360/64, 10.1, 10.2, 360/10.3; 358/312

[56] References Cited

U.S. PATENT DOCUMENTS

| | | | |
|---|---|---|---|
| 4,120,007 | 10/1978 | Sato | 360/64 |
| 4,197,562 | 4/1980 | Kikuya | 360/64 |
| 4,426,666 | 1/1984 | Roboysh | 360/10.3 |

FOREIGN PATENT DOCUMENTS

| | | |
|---|---|---|
| 102809 | 3/1984 | European Pat. Off. . |
| 3234153 | 4/1983 | Fed. Rep. of Germany . |
| 3225584 | 5/1983 | Fed. Rep. of Germany . |

*Primary Examiner*—Alan Faber
*Attorney, Agent, or Firm*—Andrus, Sceales, Starke & Sawall

[57] ABSTRACT

A reproduced signal switching circuit for a reproducing apparatus, comprises a switching circuit for switching output signals of rotary heads for special reproduction so as to obtain a continuous reproduced signal, a switching signal producing circuit for producing a switching signal responsive to an output pickup pulse of a rotation detecting circuit which detects the rotation of a rotary body which is mounted with the rotary heads, and for applying the switching signal to the switching circuit so as to switch the switching circuit, and a voltage supplying circuit for supplying a voltage which is in accordance with a tape moving speed to the switching signal producing circuit during the special reproduction. The switching signal producing circuit comprises time constant circuits for starting charging operations responsive to the pickup pulse, and a circuit for producing a switching signal having a polarity which changes when charged voltages in the time constant circuits reach a predetermined voltage. The voltage supplying circuit supplies the voltage to be charged to the time constant circuits.

7 Claims, 8 Drawing Figures

REPRODUCED SIGNAL SWITCHING CIRCUIT FOR REPRODUCING APPARATUS HAVING ROTARY HEADS FOR SPECIAL REPRODUCTION

BACKGROUND OF THE INVENTION

The present invention generally relates to reproduced signal switching circuits for reproducing apparatuses having rotary heads for special reproduction, and more particularly to a reproduced signal switching circuit which obtains a continuous reproduced signal by switching signals reproduced by rotary heads for special reproduction, during a special reproduction in which the reproduction is carried out with a tape moving speed which is different from the tape moving speed employed during a normal reproduction.

Generally, in an apparatus which uses rotary heads to record and reproduce a video signal on and from tracks which are formed obliquely to the longitudinal direction of a magnetic tape, a special reproduction is sometimes carried out with a tape moving speed (hereinafter simply referred to as a tape speed) which is different from the tape speed employed during a normal reproduction. The special reproduction includes a quick-motion reproduction in which the tape speed is faster than the tape speed employed during the normal reproduction, a slow-motion reproduction in which the tape speed is slower than the tape speed employed during the normal reproduction, and a still picture reproduction in which the tape is stationary. Because the tape speed employed during the special reproduction is different from the tape speed employed during the normal reproduction, the inclination angle of scanning loci of the rotary heads with respect to the longitudinal direction of the tape during the special reproduction becomes different from the inclination angle of the scanning loci of the rotary heads at the time of the normal reproduction. As a result, during the special reproduction, the tracks which are to be scanned by the rotary heads are not scanned in full. In other words, some parts of the tracks remain unscanned by the rotary heads during the special reproduction, and the level of the reproduced signal decreases when the rotary heads do not scan over such track parts. Accordingly, there is a type of a recording and/or reproducing apparatus which is provided with rotary heads exclusively for the special reproduction, in order to minimize the unscanned track parts and reduce the decrease in the level of the reproduced signal during the special reproduction. The rotary heads exclusively for the special reproduction, have widths which are greater than the widths of the rotary heads which are used during the normal reproduction (and usually used also for the recording). In this type of a recording and/or reproducing apparatus, a pair of rotary heads exclusively for the special reproduction, are mounted on a rotary body such as a rotary drum, at positions angularly shifted with respect to a pair of rotary heads for the normal reproduction.

On the other hand, the signals reproduced by the pair of reproducing rotary heads must be converted into a continuous reproduced signal. In order to perform this conversion, a switching signal is formed by use of pulses which are detected responsive to the rotation of the rotary body which is mounted with the reproducing rotary heads, and the signals reproduced by the reproducing rotary heads are switched by use of the switching signal. A signal picked up from a stationary pickup head which cooperates with magnets mounted on another rotary body which rotates unitarily with the rotary body such as the rotary drum, is used to form the switching signal. The positions of the magnets which cooperate with the stationary pickup head, the rotary heads for the normal reproduction, and the rotary heads exclusively for the special reproduction, differ on the respective rotary bodies. For this reason, the switching signal is obtained by delaying the signal which is picked up by the stationary pickup head by a delay time corresponding to the positional differences.

A conventional reproduced signal switching circuit is designed to switch elements which are connected to time constant circuits of monostable multivibrators which delay the signal picked up by the stationary pickup head, so as to switch the time constants of the time constant circuits and switch the delay times of the monostable multivibrators between the normal reproduction and the special reproduction.

However, the tape speed is different depending on the kind of special reproduction. Hence, when the rotational speed of the rotary heads are maintained the same for each of the kinds of special reproduction, the relative linear speeds of the rotary heads with respect to the tape will vary depending on the tape speed. When the relative linear speeds of the rotary heads with respect to the tape vary, the frequency of a horizontal synchronizing signal within a video signal which is reproduced by the rotary heads becomes different from the regular horizontal synchronizing signal frequency, and it becomes impossible to obtain a satisfactory reproduced picture. Thus, the rotational speed of the rotary body which is mounted with the rotary heads, may be varied, so that the relative linear speeds of the rotary heads with respect to the tape during the special reproduction become the same as the relative linear speeds of the rotary heads at the time of the normal reproduction.

When the rotational speed of the rotary body which is mounted with the rotary heads, is varied, it is necessary to change the timing with which the signals reproduced by the rotary heads are switched so as to obtain the continuous reproduced signal. However, the timing with which the signals reproduced by the rotary heads are switched, is fixed by the time constants of the time constant circuits. For this reason, when the switching of the reproduced signals is performed by the switching signal in this case, the switching does not take place at the correct position (that is, at a position within a vertical blanking period of the reproduced video signal). In an extreme case, there is a problem in that a vertical blanking part appears in the reproduced picture.

SUMMARY OF THE INVENTION

Accordingly, it is a general object of the present invention to provide a novel and useful reproduced signal switching circuit for a reproducing apparatus having rotary heads for special reproduction, in which the problems described heretofore are eliminated.

Another and more specific object of the present invention is to provide a reproduced signal switching circuit which switches signals reproduced by rotary heads which are mounted on a rotary body, by use of a switching signal, so as to obtain a continuous reproduced signal. The rotational speed of the rotary body is varied depending on a tape speed employed during a special reproduction. In the reproduced signal switching circuit of the present invention, the timing with which the switching signal is formed, is changed depending on the tape speed employed during the special reproduction. According to the reproduced signal switching circuit of the present invention, the switching of the reproduced signals is constantly performed with a correct timing for each of the kinds of special reproduction, and it is possible to obtain a satisfactory reproduced picture during the special reproduction.

Still another object of the present invention is to provide a reproduced signal switching circuit which is designed to vary time constants of monostable multivibrators depending on a tape speed employed during a special reproduction, which monostable multivibrators form a switching signal which is used to switch signals reproduced by a pair of rotary heads so as to obtain a continuous reproduced signal.

Other objects and further features of the present invention will be apparent from the following detailed description when read in conjunction with the accompanying drawings.

DETAILED DESCRIPTION

First, description will be given with respect to the positional relationships of rotary heads of a recording and reproducing apparatus which is applied with a reproduced signal switching circuit according to the present invention, by referring to FIG. 1.

Figure 1:
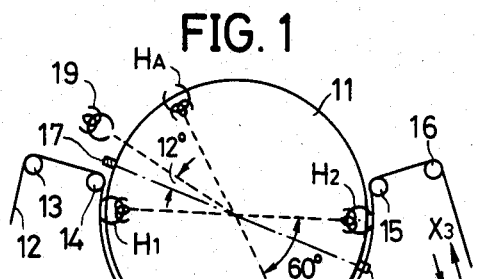
FIG. 1 is a diagram for explaining a positional relationship between rotary heads and a pickup head.

In FIG. 1, a rotary plate 11 such as a rotary drum or a head disc plate, is mounted with rotary heads $H_1$ and $H_2$ for recording and normal reproduction, at mutually opposing positions in a diametral direction thereof. The rotary body 11 is also mounted with rotary heads $H_A$ and $H_B$ for special reproduction, at mutually opposing positions in a diametral direction thereof. With respect to a rotating direction $X_1$ of the rotary body 11, the rotary heads $H_A$ and $H_B$ lag the respective rotary heads $H_1$ and $H_2$ by an angle of 60°, for example. The rotary heads $H_A$ and $H_B$ have gaps with an azimuth angle which is the same as the azimuth angle of the gap of one of the rotary heads $H_1$ and $H_2$. Further, the track widths of the rotary heads $H_A$ and $H_B$ are greater than the track widths of the rotary heads $H_1$ and $H_2$. A magnetic tape 12 is wrapped around the outer peripheral surface of the rotary body 11 over an angular range which is greater than 180°, under the guidance of guide poles 13 through 16. As is well known, the tape 12 is driven in a state pinched between a capstan (not shown) and a pinch roller (not shown). The tape 12 moves in the direction of an arrow $X_2$ during a recording, a normal reproduction, and a forward special reproduction. The tape 12 moves in the direction of an arrow $X_3$ during a reverse special reproduction. Further, the movement of the tape 12 is stopped during the still picture reproduction.

Another rotary body (not shown) which rotates unitarily with the rotary body 11, comprises magnets 17 and 18 which is fixed at mutually opposing positions in a diametral direction of this other rotary body. The magnet 17 has an N-pole exposed at the outer peripheral surface of the other rotary body, and the magnet 18 has an S-pole exposed at the outer peripheral surface of the other rotary body. A single stationary pickup head 19 is arranged at a position so that the magnets 17 and 18 will successively oppose the pickup head 19 as the other rotary body rotates unitarily with the rotary body 11. The pickup head 19 produces a pulse every time each of the magnets 17 and 18 passes by the pickup head 19. For example, the pickup head 19 produces a positive polarity pulse when the magnet 17 passes by the pickup head 19, and produces a negative polarity pulse when the magnet 18 passes by the pickup head 19.

At a point when the rotary head $H_1$ just starts to scan over the tape 12, the pickup head 19 lags the magnet 17 by 12° in the rotating direction $X_1$, so as to be in conformance with an existing standard. Accordingly, as will be described later on in the specification, the output pulse of the pickup head 19 is formed into a switching signal by electrically delaying the output pulse by a delay time corresponding to the rotational period of approximately 12° from the time when the pickup head 19 detects the magnet 17 or 18, during the recording or normal reproduction in which the rotary heads $H_1$ and $H_2$ are used. The output pulse of the pickup head 19 is delayed in monostable multivibrators in a phase control system of a head servo circuit. The switching signal is used to switch signals which are reproduced by the rotary heads $H_1$ and $H_2$ so as to obtain a continuous reproduced signal. On the other hand, the rotary heads $H_A$ and $H_B$ are used during the special reproduction, and the physical switching point of the signals reproduced by the rotary heads $H_A$ and $H_B$ must be correct. Hence, during the special reproduction, the output pulse of the pickup head 19 is electrically delayed by a delay time which is equal to a time it takes for the rotary head $H_A$ or $H_B$ to start scanning over the tape 12 from the time when the pickup head 19 detects the magnet 17 or 18, so as to obtain the switching signal. This delay time is equal to a time it takes for the rotary body 11 to rotate over an angle of approximately 72° from the time when the pickup head 19 detects the magnet 17 or 18.

Conventionally, monostable multivibrators are used to electrically delay the output pulse of the pickup head 19 and obtain the switching circuit. The delay times of the monostable multivibrators are switched by switching the time constants of time constant circuits of the monostable multivibrators, between the normal reproduction and the special reproduction. For example, the rotary body 11 which is mounted with the rotary heads $H_1$ and $H_2$, rotates at a rotational speed of 30 rps, and during the normal reproduction, the delay times of the monostable multivibrators are set to a time it takes for the rotary heads $H_1$ and $H_2$ to rotate over 12°. Hence, the delay times of the monostable multivibrators during the normal reproduction can be described by $(1/30)\times(12/360)\times10^3 \approx 1.1$ msec. During the special reproduction, the delay times of the monostable multivibrators are set to a time it takes for the rotary heads $H_A$ and $H_B$ to rotate over 72°. Thus, the delay times of the monostable multivibrators during the special reproduction can be described by $(1/30)\times(72/360)\times10^3 \approx 6.7$ msec.

However, there are various kinds of special reproduction, such as a quick-motion reproduction, a slow-motion reproduction, and a still picture reproduction. The tape speed differs greatly depending on the kind of the special reproduction. When the rotational speeds of the rotary heads are maintained the same for all kinds of special reproduction although the tape speed differs depending on the kind of the special reproduction, the relative linear speeds of the rotary heads with respect to the tape will be different for each kind of the special reproduction As a result, the frequency of the reproduced horizontal synchronizing signal within the reproduced video signal, will be different from the regular horizontal synchronizing signal frequency.

Accordingly, during the special reproduction, a phase locked loop (PLL) in the phase control system of the head servo system, is cut off. For example, a voltage in accordance with the rotational speed of a capstan motor, is obtained as an output signal of the phase control system and is supplied to a motor (head motor) which rotates the rotary body 11. Thus, the rotational speed of the head motor is controlled so that the frequency of the reproduced horizontal synchronizing signal within the reproduced video signal which is obtained during the special reproduction, is equal to the regular horizontal synchronizing signal frequency. For this reason, during the quick-motion reproduction which is carried out with a tape speed which is faster than the tape speed employed during the normal reproduction, the rotational speed of the head motor changes within a large range compared to the rotational speed of the head motor employed during the normal reproduction, as the reproducing speed (tape speed) increases. For example, during a forward or reverse ten-times speed quick-motion reproduction in which the tape speed is set to ten times the tape speed employed during the normal reproduction, the rotational speed of the head motor undergoes a change within a large range which is over 5.7% of the rotational speed of the head motor employed during the normal reproduction.

However, the time constants of the monostable multivibrators during the special reproduction, is conventionally fixed regardless of the reproducing speed. Thus, there is a problem in that the switching point of the signals which are reproduced from the rotary heads, greatly deviates from the regular switching point as the reproducing speed increases.

Accordingly, the reproduced signal switching circuit of the present invention is designed to eliminate the problems described heretofore, and an embodiment of the reproduced signal switching circuit according to the present invention will now be described in conjunction with FIG. 1.

Figure 2:
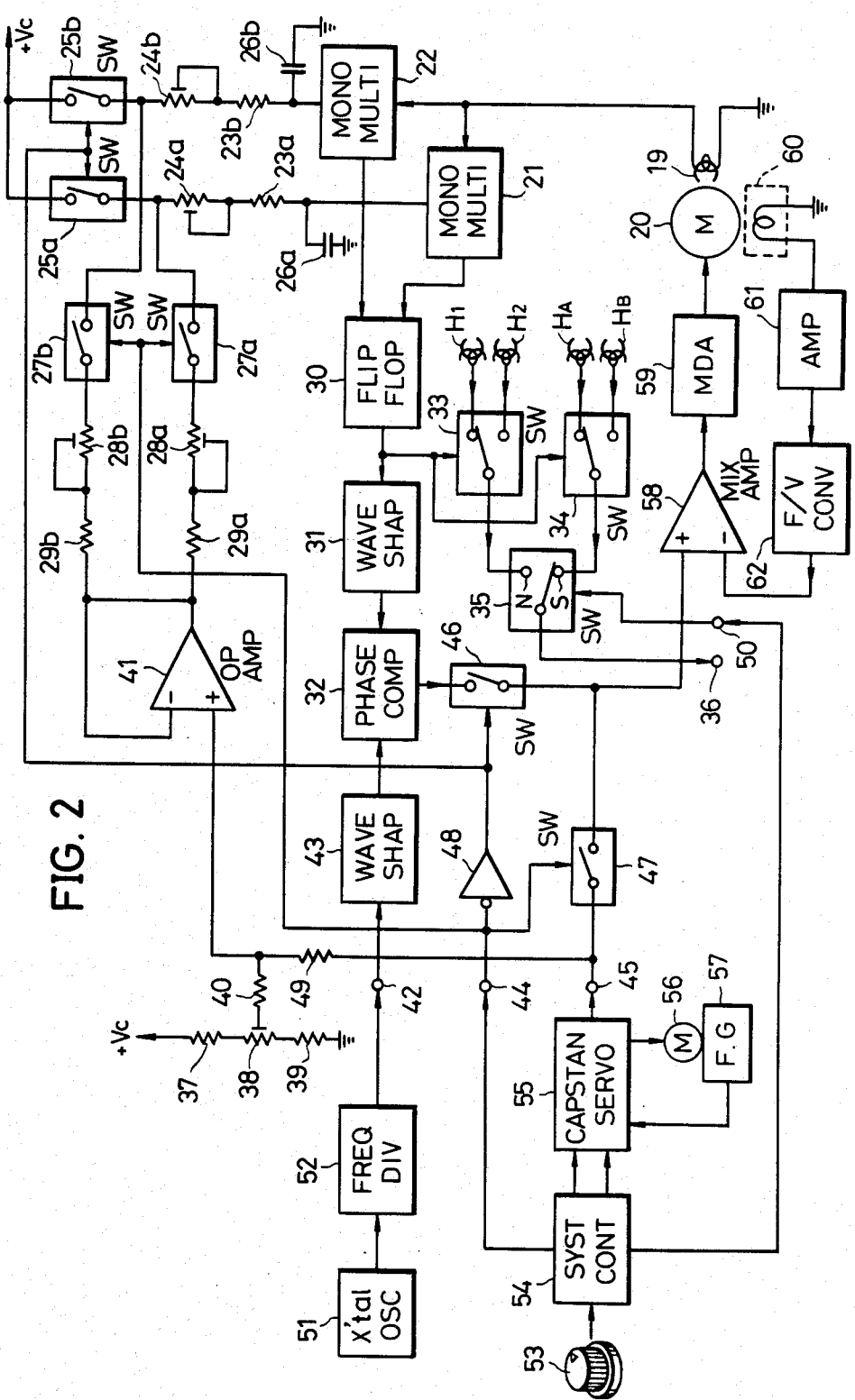
FIG. 2 is a systematic circuit diagram showing an embodiment of a reproduced signal switching circuit according to the present invention.

In FIG. 2, a head motor 20 rotates the rotary body 11 shown in FIG. 1. The rotational phase of the head motor 20 is detected by the pickup head 19 which cooperates with the magnets 17 and 18. A rotational phase detection pulse signal a shown in FIG. 3(A) produced from the pickup head 19, is supplied to monostable multivibrators 21 and 22. The monostable multivibrator 21 is triggered responsive to a positive polarity pulse, and the monostable multivibrator 22 is triggered responsive to a negative polarity pulse. Pulse signals are alternately obtained from the monostable multivibrators 21 and 22 for every one-half revolution of the head motor 20. The pulses in the output pulse signals of the monostable multivibrators 21 and 22 have widths determined by respective time constant circuits of the monostable multivibrators 21 and 22. The time constant circuit of the monostable multivibrator 21, is made up of resistors 23a and 29a, variable resistors 24a and 28a, switching circuits 25a and 27a, and a capacitor 26a. On the other hand, the time constant circuit of the monostable multivibrator 23, is made up of resistors 23b and 29b, variable resistors 24b and 28b, switching circuits 25b and 27b, and a capacitor 26b.

The output pulse signals of the monostable multivibrators 21 and 22 are respectively supplied to a flip-flop 30. The flip-flop 30 produces a signal which changes its level between a high level and a low level, when output pulse signals of the monostable multivibrators 21 and 22 rise to a predetermined level (Vcc/2). The output signal of the flip-flop 30 is a square wave signal having a frequency (30 Hz when the video signal is of the NTSC system) which is ½ the frequency of the vertical synchronizing signal of the video signal.

The output signal of the flip-flop 30 is subjected to a wave-shaping in a wave shaping circuit 31, and is then supplied to one input terminal of a phase comparator 32. In addition, the output signal of the flip-flop 30 is supplied to switching circuits 33 and 34 as a switching signal. The switching circuit 33 switches the signals reproduced by the rotary heads $H_1$ and $H_2$, and the switching circuit 34 switches the signals reproduced by the rotary heads $H_A$ and $H_B$. Accordingly, the switching circuit 33 selectively and alternately produces the signals reproduced by the rotary heads $H_1$ and $H_2$, for every one track scanning period (period of one field), and supplies the produced signal to a terminal N of a head selection switching circuit 35. On the other hand, the switching circuit 34 selectively and alternately produces the signals reproduced by the rotary heads $H_A$ and $H_B$, for every one track scanning period (period of one field), and supplies the produced signal to a terminal S of the head selection switching circuit 35.

The head selection switching circuit 35 is switched responsive to a switching signal which is received from a system controller 54 through a terminal 50, so that the head selection switching circuit 35 is connected to the terminal N during the normal reproduction and is connected to the terminal S during the special reproduction. Accordingly, during the normal reproduction, the head selection switching circuit 35 produces a time-sequentially multiplexed signal made up of the signals reproduced by the rotary heads $H_1$ and $H_2$. On the other hand, during the special reproduction, the head selection switching circuit 35 produces a time-sequentially multiplexed signal made up of the signals reproduced by the rotary heads $H_A$ and $H_B$. The signal produced from the head selection switching circuit 35, is obtained through an output terminal 36.

A resistor 37 has one terminal thereof connected to an input terminal of a positive D.C. voltage source +Vc, and the other terminal thereof grounded through a variable resistor 38 and a resistor 39 which are connected in series. Hence, a voltage which is obtained by voltage-dividing the voltage Vc by a circuit made up of the resistors 37 through 39, is obtained from a slider of the variable resistor 38. This voltage from the slider of the variable resistor 38, is passed through a mixing resistor 40, and is supplied to a non-inverting input terminal of an operational amplifier 41 which constitutes a voltage follower.

A signal which is obtained by frequency-dividing an output signal of a crystal oscillator 51 in a frequency divider 52, and has a frequency which is ½ the frequency of the vertical synchronizing signal, is applied to an input terminal 42 as a reference signal for the head servo circuit. The signal applied to the input terminal 42, is converted into a trapezoidal wave in a wave shaping circuit 43. An output trapezoidal wave of the wave shaping circuit 43 is supplied to the other input terminal of the phase comparator 32 wherein the phase of the trapezoidal wave is compared with the phase of the output signal of the wave shaping circuit 31. An error voltage which is in accordance with the phase difference between the two signals, is produced from the phase comparator 32. This error voltage is supplied to a switching circuit 46. Instead of supplying the output signal of the crystal oscillator 51 to the terminal 42 through the frequency divider 52, it is also possible to selectively switch and supply the output signal of the frequency divider 52 and the vertical synchronizing signal to the terminal 42. In this case, the vertical synchronizing signal can be separated from the video signal or from an external signal.

During the special reproduction, the system controller 54 supplies a high-level switching signal to an input terminal 44. On the other hand, during the normal reproduction, the system controller 54 supplied a low-level switching signal to the input terminal 44. The switching signal supplied to the input terminal 44, is supplied to the switching circuits 27a, 27b, and 47. Further, the switching signal supplied to the input terminal 44, is also supplied to the switching circuits 25a, 25b, and 46, through an inverter 48.

Depending on the rotational position of a special reproduction changing dial (search dial) 53, the system controller 54 supplies a search instruction signal and an instruction signal which is in accordance with the reproducing speed of the special reproduction, to a capstan servo circuit 55. The capstan servo circuit 55 rotates a capstan motor 56 at a rotational speed which is in accordance with the instruction signals received from the system controller 54. A frequency generator 57 generates a signal having a frequency which is in accordance with the rotational speed of the capstan motor 56. The output signal of the frequency generator 57 is supplied to the capstan servo circuit 55 wherein the signal is converted into a voltage which is dependent on the frequency of the signal, and this voltage is converted into a predetermined voltage by being passed thrugh a circuit which is made up of an operational amplifier and resistors within the capstan servo circuit 55. The predetermined voltage produced from the capstan servo circuit 55, is supplied to a terminal 45. The predetermined voltage supplied to the terminal 45, is supplied to a switching circuit 47, and is also supplied to a non-inverting input terminal of the operational amplifier 41 through a mixing resistor 49.

Figure 8:
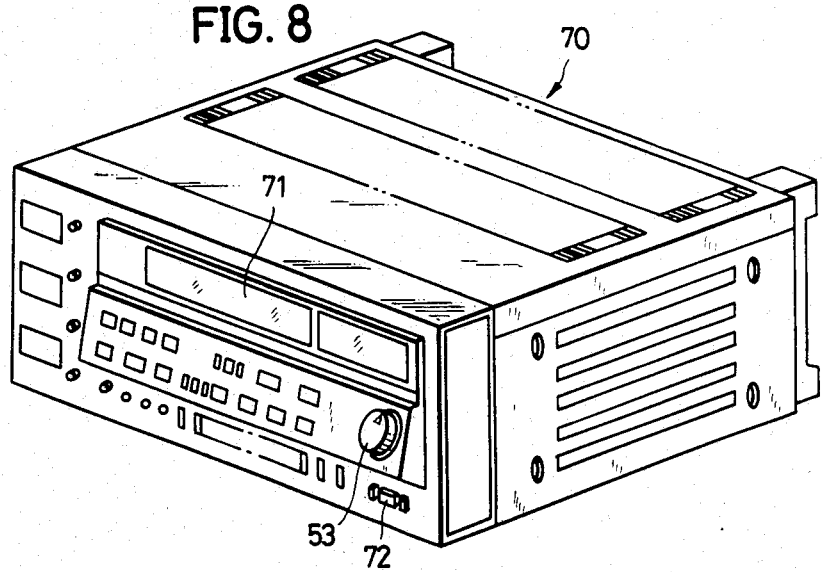
FIG. 8 is a perspective view showing an example of an external appearance of a recording and reproducing apparatus which is provided with the reproduced signal switching circuit according to the present invention.

For example, the special reproduction changing dial 53 is rotatably provided on a front panel of a recording and reproducing apparatus 70 shown in FIG. 8. A cassette inserting part 71, a power source switch 72, and other predetermined manipulating buttons or switches are arranged at the front of the recording and reproducing apparatus 70.

The switching circuits 25a, 25b, 27a, 27b, 46, and 47, are designed so that these switches are turned ON responsive to a high-level switching signal and are turned OFF responsive to a low-level switching circuit. Accordingly, when the mode of the recording and reproducing apparatus 70 is set to the special reproduction mode, the switching circuits 27a, 27b, and 47 are turned ON and the switching circuits 25a, 25b, and 46 are turned OFF, because a high-level switching signal is applied to the input terminal 44 in this mode. When the switching circuit 46 is turned OFF, the transmission of the output error voltage of the phase comparator 32 is blocked. Further, when the switching circuit 47 is turned ON, the predetermined voltage applied to the input terminal 45, is passed through the switching circuit 47 and is supplied to a non-inverting input terminal of a mixing amplifier 58 as an output signal of the phase control system.

A rotation detection signal having a frequency which is proportional to the rotational speed of the head motor 20, is generated from a frequency generator 60. The output rotation detection signal of the frequency generator 60, is passed through an amplifier 61 and is supplied to a frequency-to-voltage (F/V) converter 62. The F/V converter 62 converts the output signal of the amplifier 61 into a rotational speed detection voltage which is in accordance with the rotational speed of the head motor 20. This rotational speed detection voltage is supplied to an inverting input terminal of the mixing amplifier 58 as an output signal of the speed control system.

The voltages which are mixed and amplified in the mixing amplifier 58, and an output voltage of the mixing amplifier 58 is supplied to a motor driving amplifier (MDA) 59 wherein the voltage is converted into a specific voltage. The output voltage of the MDA 59 is applied to the head motor 20, and the rotational speed and the rotational phase of the head motor 20 are accordingly controlled. Hence, during the special reproduction, the rotation of the head motor 20 is controlled so that the frequency of the horizontal synchronizing signal within the video signals reproduced by the rotary heads $H_A$ and $H_B$ becomes equal to the regular horizontal synchronizing signal frequency which is constant.

During the normal reproduction, a low-level switching signal is applied to the terminal 44. Thus, the switching circuits 27a, 27b, and 47 are turned OFF. On the other hand, the switching circuits 25a, 25b, and 46 are turned ON because a high-level signal is applied thereto from the inverter 48. As a result, the rotational phase of the head motor 20 is controlled by the output error voltage of the phase comparator 32 so that the head motor 20 rotates at a predetermined rotational speed. In addition, the time constant circuit of the monostable multivibrator 21 is constituted by the resistors 23a and 24a and the capacitor 26a, and the time constant circuit of the monostable multivibrator 22 is constituted by the resistors 23b and 24b and the capacitor 26b.

Figure 7:
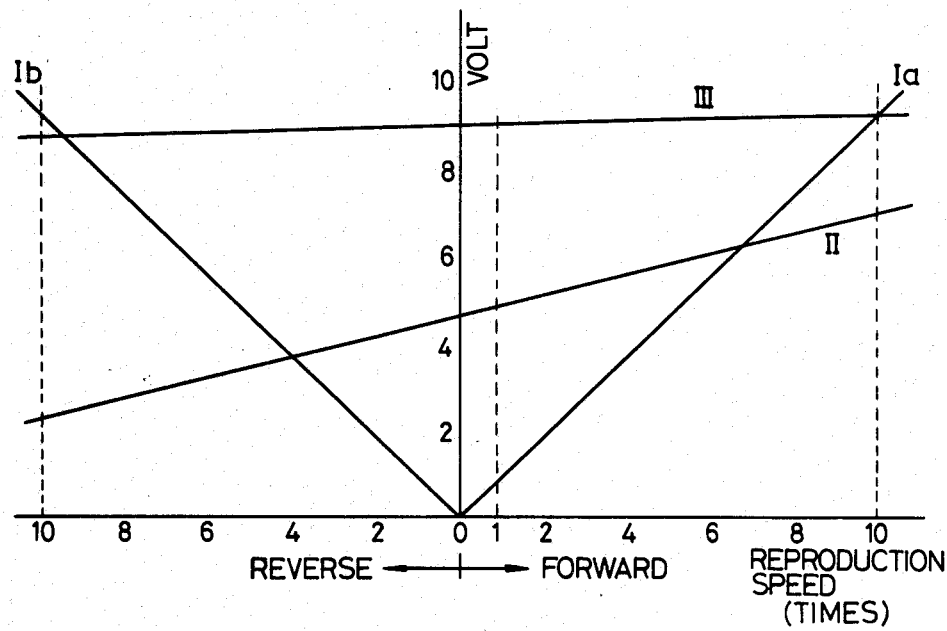
FIG. 7 is a graph for explaining voltages at each part of the circuit shown in FIG. 2.

In the normal reproduction, the reproducing speed corresponds to a forward one-times speed. Hence, a voltage on a line Ia in FIG. 7 for the one-times speed, is obtained as the voltage which is obtained by subjecting the output signal of the frequency generator 57 to the frequency-to-voltage conversion. A voltage on a line II in FIG. 7 for the one-times speed, is applied to the terminal 45 from the capstan servo circuit 55. The voltage applied to the terminal 45 is subjected to a voltage division by the resistors 40 and 49, and a divided voltage is added with a divided voltage which is obtained by dividing the voltage from the variable resistor 38 by the resistors 40 and 49. An added voltage which is obtained by adding the two divided voltages, is supplied to the non-inverting input terminal of the operational amplifier 41. Accordingly, a voltage on a line III in FIG. 7 for the one-times speed, is produced from the operational amplifier 41.

Figure 3:
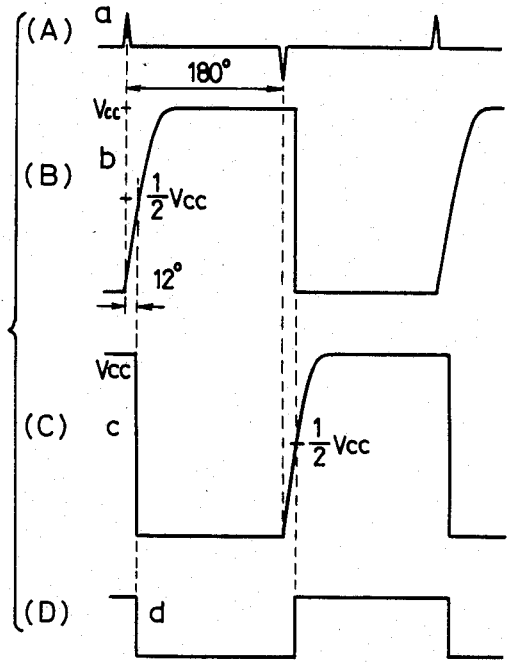
FIGS. 3(A) through 3(D) show signal waveforms at essential parts of the circuit shown in FIG. 2 during a normal reproduction.

The rising times of the output signals of the monostable multivibrators 21 and 22 shown in FIGS. 3(B) and 3(C), are determined by the time constant circuits of the monostable multivibrators 21 and 22. A time it takes for the output signals of the monostable multivibrators 21 and 22 to rise to ½ the predetermined voltage Vcc (for example, 12 volts), that is, a time between the pulse of the pulse signal a shown in FIG. 3(A) and a rising or falling edge of a switching signal d shown in FIG. 3(D), is equal to the time it takes for the rotary body 11 shown in FIG. 1 to rotate over an angle of 12°. A time interval between a positive polarity pulse and a negative polarity pulse of the pulse signal a, is equal to a time it takes for the rotary body 11 to rotate over an angle of 180°.

Next, when the still picture reproduction is to be carried out during the special reproduction, the special reproduction changing dial 53 is rotated so that an indicator assumes the position for the still picture reproduction. In this case, a high-level switching signal is supplied to the terminal 44 from the system controller 54. As a result, the switching circuits 27a, 27b, and 47 are turned ON, and the switching circuits 25a 25b, and 46 are turned OFF. When the switching circuit 46 is turned OFF and the switching circuit 47 is turned ON, the transmission of the signal from the phase control system to the head motor 20 is blocked. Consequently, the head motor 20 is rotated responsive to a signal which is in accordance with the rotation of the capstan motor 56, which capstan motor 56 is rotated by the system controller 54 and the capstan servo circuit 55.

Figure 4:
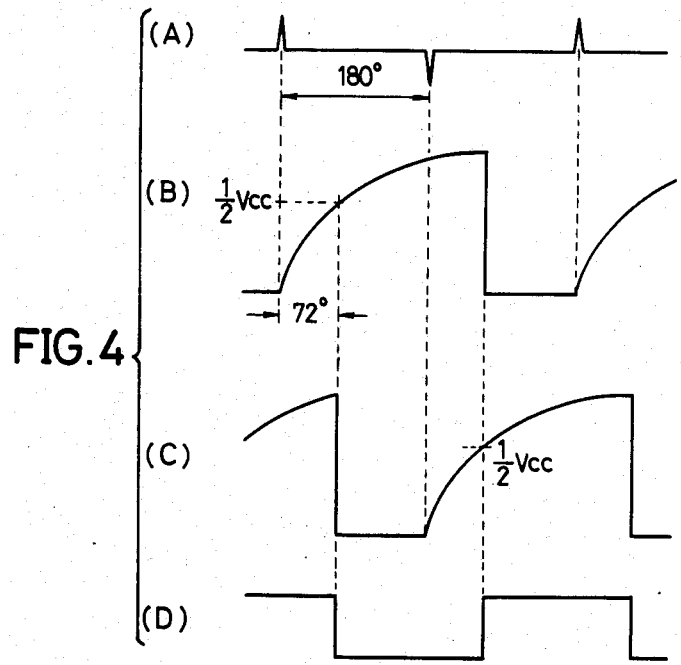
FIGS. 4(A) through 4(D) show signal waveforms at essential parts of the circuit shown in FIG. 2 during a still picture reproduction.

On the other hand, because the switching circuits 25a and 25b are turned OFF and the switching circuits 27a and 27b are turned ON, the time constant circuit of the monostable multivibrator 21 is constituted by the resistors 23a, 24a 28a, and 29a and the capacitor 26a, and the time constant circuit of the monostable multivibrator 22 is constituted by the resistors 23b, 24b, 28b, and 29b and the capacitor 26b. During the still picture reproduction, the reproducing speed is zero in FIG. 7, and the output of the frequency generator 57 is zero. Hence, in this case, a voltage on the line II in FIG. 7 for the zero reproducing speed, is applied to the terminal 45 from the capstan servo circuit 55. The voltage applied to the terminal 45 is subjected to a voltage division by the resistors 40 and 49, and a divided voltage is added with a divided voltage which is obtained by dividing the voltage from the variable resistor 38 by the resistors 40 and 49. An added voltage which is obtained by adding the two divided voltages, is supplied to the non-inverting input terminal of the operational amplifier 41. With respect to the output pulse signal of the pickup head 19 shown in FIG. 4(A), the output signal waveforms of the monostable multivibrators 21 and 22 shown in FIGS. 4(B) and 4(C) are determined by the time constant circuits of the monostable multivibrators 21 and 22. A time required for the output signals of the monostable multivibrators 21 and 22 to rise to a voltage Vcc/2, is equal to the time it takes for the rotary body 11 to rotate over an angle of 72°. In this case, the switching signal shown in FIG. 4(D) is produced from the flip-flop 30.

Figure 5:
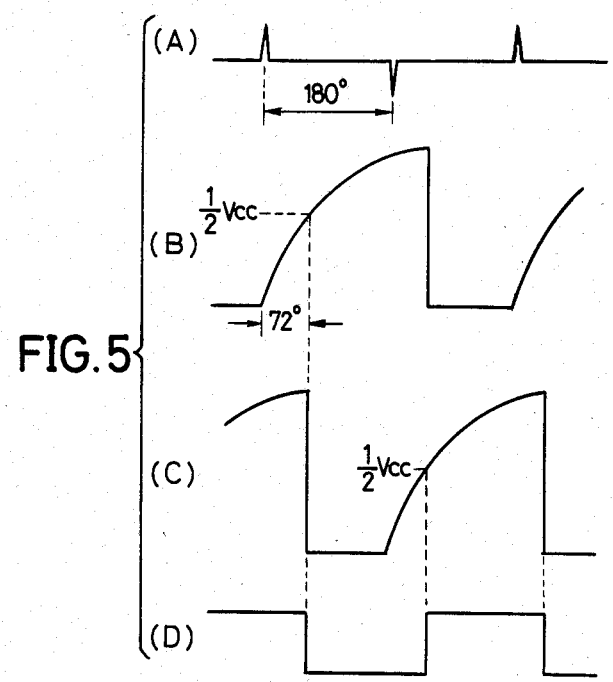
FIGS. 5(A) through 5(D) show signal waveforms at essential parts of the circuit shown in FIG. 2 during a ten-times speed forward reproduction.

Next, when carrying out a forward ten-times speed reproduction, for example, the special reproduction changing dial 53 is rotated so that the indicator assumes a position for the ten-times speed reproduction. In this case, the capstan motor 56 is rotated by the system controller 54 and the capstan servo circuit 55, at a rotational speed which is in accordance with the forward ten-times speed reproduction. A voltage on the line Ia in FIG. 7 for the forward ten-times speed, is produced from the frequency generator 57. Further, a voltage on the line II in FIG. 7 for the forward ten-times speed, is applied to the terminal 45. The voltage applied to the terminal 45 is subjected to a voltage division by the resistors 40 and 49, and a divided voltage is added with a divided voltage which is obtained by dividing the voltage from the variable resistor 38 by the resistors 40 and 49. An added voltage which is obtained by adding the two divided voltages, is supplied to the non-inverting input terminal of the operational amplifier 41. Accordingly, the voltage applied to the time constant circuits of the monostable multivibrators 21 and 22, is higher than the voltage applied to the time constant circuits during the still picture reproduction. Moreover, the rises in the output signals of the monostable multivibrators 21 and 22 are more steep than the rises in the output signals during the still picture reproduction, as may be seen from FIGS. 5(B) and 5(C). In other words, the time required for the output signals of the monostable multivibrators 21 and 22 to reach the predetermined voltage Vcc/2 (that is, the time it takes for the rotary body 11 to rotate over an angle of 72°), is shorter than the time required during the still picture reproduction. For this reason, even when the rotational speed of the rotary body 11 becomes faster than the rotational speed during the still picture reproduction, the correct switching signal shown in FIG. 5(D) is obtained so as to switch the reproduced signals when the rotary body 11 rotates over the angle of 72° from the time when the pickup head 19 produces the pulse shown in FIG. 5(A).

Figure 6:
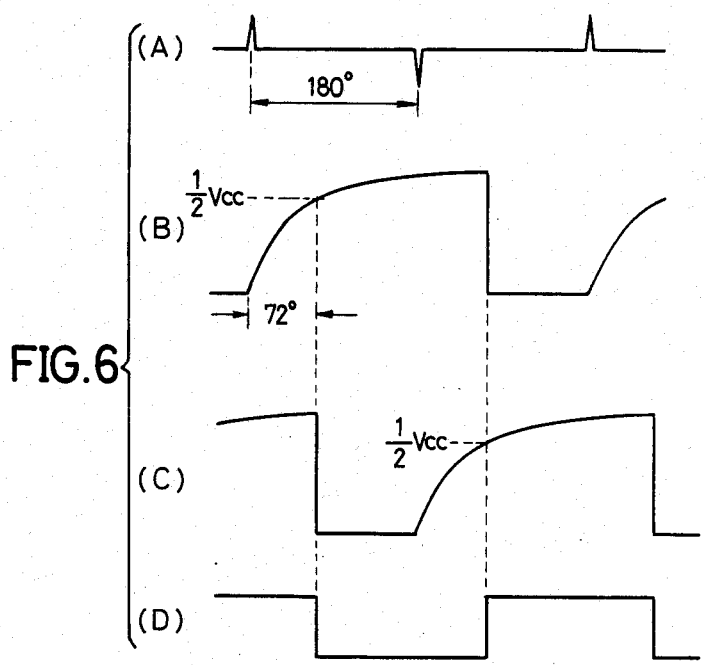
FIGS. 6(A) through 6(D) show signal waveforms at essential parts of the circuit shown in FIG. 2 during a ten-times speed reverse reproduction.

Next, during the reverse ten-times speed reproduction, for example, the special reproduction changing dial 53 is rotated so that the indicator assumes a position for the reverse ten-times speed reproduction. In this case, the capstan motor 56 is rotated in a reverse direction, and the tape 12 is moved in the reverse direction. A voltage on a line Ib in FIG. 7 for the reverse ten-times speed, is produced from the frequency generator 57. A voltage on the line II in FIG. 7 for the reverse ten-times speed, is applied to the terminal 45 from the capstan servo circuit 55. Accordingly, a voltage on the line III in FIG. 7 for the reverse ten-times speed, is produced from the operational amplifier 41. The output voltage of the operational amplifier 41 is smaller than the output voltage during the still picture reproduction. In addition, the rises in the output signals of the monostable multivibrators 21 and 22 are more gradual compared to the rises in the output signals during the still picture reproduction, as may be seen from FIGS. 6(B) and 6(C). Thus, even during the reverse ten-times speed reproduction in which the rotational speed of the rotary body 11 is slightly slower than the rotational speed during the still picture reproduction, it is possible to obtain the correct switching signal shown in FIG. 6(D).

The delay times of the monostable multivibrators 21 and 22, that is, the time it takes for the output signals of the monostable multivibrators 21 and 22 to rise to the predetermined voltage Vcc/2 responsive to the output pulse signal of the pickup head 19, are equal to the time it takes for the rotary body 11 to rotate over the angle of 72°. For example, the delay times of the monostable multivibrators 21 and 22 are set to 6.72 msec during the still picture reproduction, 6.3 msec during the forward ten-times speed reproduction, and 7.1 msec during the reverse ten-times speed reproduction.

Further, the present invention is not limited to these embodiments, but various variations and modifications may be made without departing from the scope of the present invention.

What is claimed is:

1. A reproduced signal switching circuit for a reproducing apparatus, said reproducing apparatus having a rotary body provided with rotary heads for normal reproduction and rotary heads for special reproduction, said rotary heads for special reproduction being provided at positions on said rotary body separated from the respective rotary heads for normal reproduction by a predetermined angle, said special reproduction being a reproduction which is carried out with a tape moving speed which is different from a tape moving speed employed during the normal reproduction, and rotation detecting means for producing a pickup pulse responsive to the rotation of said rotary body when said rotary heads assume predetermined angular positions, said reproduced signal switching circuit comprising:

a switching circuit for switching output signals of said rotary heads for special reproduction so as to obtain a continuous reproduced signal;

switching signal producing means for producing a switching signal responsive to the output pickup pulse of said rotation detecting means, and for applying the switching signal to said switching circuit so as to switch said switching circuit; and voltage supplying means for supplying a voltage which is in accordance with a tape moving speed to said switching signal producing means during the special reproduction, said switching signal producing means comprising time constant circuits for starting charging operations responsive to said pickup pulse, and a circuit for producing a switching signal having a polarity which changes when charged voltages in said time constant circuits reach a predetermined voltage, said voltage supplying means supplying the voltage to be charged to said time constant circuits.

2. A reproduced signal switching circuit as claimed in claim 1 in which said switching signal producing means further comprises monostable multivibrators which are connected to said time constant circuits and are applied with said pickup pulse, and a flip-flop supplied with output signals of said monostable multivibrators, for producing the switching signal when the output signals of said monostable multivibrators reach the predetermined voltage.

3. A reproduced signal switching circuit as claimed in claim 1 in which said reproducing apparatus further comprises a capstan motor for rotating a capstan which moves a tape, and voltage generating means for generating a voltage which is in accordance with the rotation of said capstan, and said voltage supplying means comprises a first circuit for supplying a predetermined voltage, and a second circuit for obtaining an added voltage by adding the predetermined voltage from said first circuit and the voltage from said voltage generating means, and for supplying the added voltage to said time constant circuits.

4. A reproduced signal switching circuit as claimed in claim 3 in which said reproducing apparatus further comprises a head motor for rotating said rotary body, and said reproduced signal switching circuit further comprises a switch which is switched so as to apply the voltage from said voltage generating means to said head motor during the special reproduction.

5. A reproduced signal switching circuit as claimed in claim 1 which further comprises switching means for switching time constants of said time constant circuits between the normal reproduction and the special reproduction.

6. A reproduced signal switching circuit as claimed in claim 1 in which a time it takes for charged voltages in said time constant circuits to reach the predetermined voltage from a time when said pickup pulse is produced from said rotation detecting means, is equal to a time it takes for one of said rotary heads for special reproduction to rotate over a predetermined angle and to start scanning over the tape from the time when said rotation detecting means produces said pickup pulse.

7. A reproduced signal switching circuit as claimed in claim 6 in which said predetermined angle is set to 72°, and the time it takes for the charged voltages in said time constant circuits to reach the predetermined voltage from the time when said pickup pulse is produced from said rotation detecting means is set to 6.72 msec during a still picture reproduction in which the movement of the tape is stopped, 6.3 msec during a forward ten-times speed reproduction in which the tape moves in a forward direction at a tape moving speed which is ten times the tape moving speed employed during the normal reproduction, and 7.1 msec during a reverse ten-times speed reproduction in which the tape moves in a reverse direction at a tape moving speed which is ten times the tape moving speed employed during the normal reproduction.

* * * * *